United States Patent [19]

Shoupp et al.

[11] 3,842,427
[45] Oct. 15, 1974

[54] PHOTOGRAPHIC CAMERA HAVING AN INTEGRAL MECHANICALLY POWERED ELECTRIC GENERATOR

[76] Inventors: William E. Shoupp, 343 Maple Ave., Pittsburgh, Pa. 15218; Walter V. Bratkowski, 3314 Idaho Ave., McKeesport, Pa. 15132

[22] Filed: July 17, 1973

[21] Appl. No.: 380,180

[52] U.S. Cl. .................................. 354/135, 310/29
[51] Int. Cl. ......................................... G03b 15/03
[58] Field of Search ............ 95/11.5; 310/36, 29, 15, 310/14; 335/259; 354/135

[56] References Cited
UNITED STATES PATENTS

| 2,491,902 | 12/1949 | Ostline | 310/36 UX |
| 2,538,577 | 1/1951 | McCarty | 95/11.5 R |
| 2,567,290 | 9/1951 | Livingston | 310/36 |
| 3,555,313 | 1/1971 | Selden | 310/15 |
| 3,633,474 | 1/1972 | Erlichman | 95/11 R |
| 3,672,813 | 6/1972 | Horton | 95/11.5 R X |
| 3,709,118 | 1/1973 | Shoupp et al. | 95/11.5 R |
| 3,732,058 | 5/1973 | Ort et al. | 95/11 L X |

Primary Examiner—Samuel S. Matthews
Assistant Examiner—Kenneth C. Hutchison
Attorney, Agent, or Firm—D. S. Buleza

[57] ABSTRACT

A photoflash lamp, or other electrical device associated with a photographic camera, is energized by an electric current produced by an electric generator that is located within the camera and actuated when the shutter is tripped. The generator employs a spring-driven keeper that changes the reluctance of a magnetic circuit and causes an associated wire coil to produce a voltage pulse that is synchronized relative to the opening of the camera aperture. The generator is compact enough to fit inside "Instamatic" type cameras and provides a simple, reliable and inexpensive substitute for the batteries now employed in such cameras.

15 Claims, 11 Drawing Figures

PHOTOGRAPHIC CAMERA HAVING AN INTEGRAL MECHANICALLY POWERED ELECTRIC GENERATOR

CROSS-REFERENCES TO RELATED APPLICATIONS

The subject matter of this application is related to that disclosed and claimed in application Ser. No. 380,179 of the same inventors and application Ser. No. 380,181 of W. E. Shoupp, W. V. Bratkowski and J. N. Esposito, which applications are filed concurrently with the present application and are assigned to the same assignee.

BACKGROUND OF THE INVENTION

1. Field Of The Invention

This invention generally relates to photographic cameras and has particular reference to a camera having integral mechanical device for generating a sufficient quantity of electrical energy to operate a photoflash lamp or other component associated with the camera.

2. Description Of The Prior Art

Photographic cameras having mechanically actuated and driven generators that produce an electric current which fires a photoflash lamp or energizes other devices in the camera are well known in the art. A camera having such an electric generator wherein a voltage pulse is produced by a flat coil of wire that is attached to the camera shutter and propelled into the gap of a permanent magnet when the shutter is tripped is disclosed and claimed in U.S. Pat. No. 3,709,118 issued Jan. 9, 1973 to the present applicants. The "built-in" electric generator replaces the batteries normally employed in the camera and thus eliminates the aggravating problem of lamp misfires due to weak or dead batteries and high-resistance contacts with the terminals of the batteries.

A camera having a flap-type shutter with a permanent magnet that enters a stationary wire coil when the shutter is actuated and thus generates a voltage which "fires" a thyratron tube in an external electrical circuit that flashes a gaseous discharge lamp is described in U.S. Pat. No. 2,538,577 issued Jan. 16, 1951 to C. W. McCarty. A camera having a magnetic circuit with an oscillating core element which generates a voltage and fires a photoflash lamp when the shutter is actuated is disclosed in U.S. Pat. No. 3,480,808 issued Nov. 25, 1969 to H. F. Rieth. A camera with an electric generator wherein the voltage is produced by a magnet which is rotated when the shutter is tripped is disclosed in Japanese Patent Publication No. 39-22075 published Oct. 7, 1964.

Various other types of electric generators per se that produce electrical energy in response to changes in the flux density or flux distribution in a magnetic circuit are disclosed in U.S. Pat. Nos. 2,426,322; 2,784,327; 2,904,707; 3,065,366 and 3,500,086.

Camera flashguns having integral electric generators comprising a permanent magnet and a pivoted armature that is actuated manually by a shutter-release cable or by a leaf spring are disclosed in U.S. Pat. Nos. Re 22,433; 2,448,897 and 2,490,225.

While the prior art cameras with integral electric generators greatly simplified the picture-taking operation by eliminating the batteries and the various problems they created, further improvements which will reduce the cost and size of the generators would be highly desirable, particularly in view of the continuing trend to make cameras as compact and reliable as possible. It would also be desirable to increase the electrical output of such integral generators without increasing their physical size and, preferably, to accomplish this with a generator that is more compact and can be easily and automatically cocked.

SUMMARY OF THE INVENTION

The foregoing objectives and additional advantages are achieved in accordance with the present invention by placing a small but powerful permanent magnet within the camera housing which provides a magnetic circuit that includes the pole pieces of the magnet and a movable keeper that is rapidly shifted relative to the pole pieces and thus effects a sudden change in the reluctance of the magnetic circuit. The keeper is latched in Spring-loaded position when the shutter is cocked and is released in synchronism with the actuation of the shutter. The resultant change in the reluctance of the magnetic circuit causes a wire coil disposed on one of the pole pieces to generate a voltage pulse which fires a photoflash lamp mounted on the camera and thus produces the additional light necessary to properly expose the film while the camera aperture is open.

According to a preferred embodiment, the keeper is returned to its original spring-loaded position by a cam that is coupled to the film-advancing and shutter-cocking mechanism and the latter is also coupled to a socket which holds a multi-flashlamp unit and indexes a fresh flashlamp into position for the next picture.

In accordance with another embodiment, the socket is so coupled with the film-advancing and shutter-cocking mechanism that the socket rotates through an angle of 30° each time the film is advanced and the camera is thus adapted to employ a multiflash unit having 12 flashlamps. This permits a roll of film having 12 shots to be completely exposed with one flash unit.

BRIEF DESCRIPTION OF THE DRAWINGS

A better understanding of the invention will be obtained by referring to the exemplary embodiments shown in the accompanying drawings, wherein.

DESCRIPTION OF THE PREFERRED EMBODIMENTS

Figure 1:
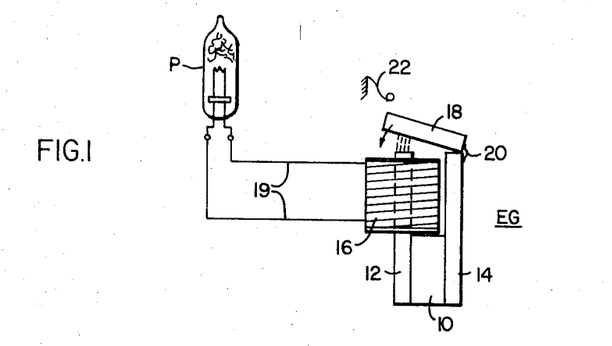
FIG. 1 is a simplified illustration of an electric generator and circuit means for a camera which automatically fires a flashlamp in synchronized relationship with the operation of the shutter in accordance with the invention.

The basic concepts involved in generating the desired pulse of electrical energy in accordance with the invention are depicted in FIG. 1. As there shown, the electric generator EG includes a permanent magnet 10, spaced pole pieces 12 and 14 that extend from the magnet, a coil 16 of fine wire disposed on at least one of the pole pieces (pole piece 12 in the drawing), and a movable member or keeper 18 that is hinged to one of the pole pieces 14 and is swung by a leaf spring 20 toward the other pole piece 12. The keeper 18 is made of ferromagnetic material (preferably the same material from which the pole pieces are fabricated) and, when swung by the spring 20, is magnetically attracted into bridging relationship with the pole pieces 12 and 14—thus rapidly changing the reluctance of the magnetic circuit. The resulting rapid change in the flux distribution in the magnetic circuit causes the wire coil 16 to produce a voltage pulse that is delivered by suitable conductors 19 to an electrical device, such as a photoflash lamp P, associated with the camera. The generator EG can thus be characterized as a "magnetic-flux" type generator.

The keeper 18 is held in raised position against the action of the spring 20 by a suitable latch means 22 that is actuated by the same mechanism in the camera that actuates the shutter. The generation of the voltage pulse by the coil 16 and the firing of the photoflash lamp P are thus synchronized with the movement of the shutter in such a manner that the light from the flashlamp illuminates the scene being photographed when the aperture of the camera is opened.

Figure 2:
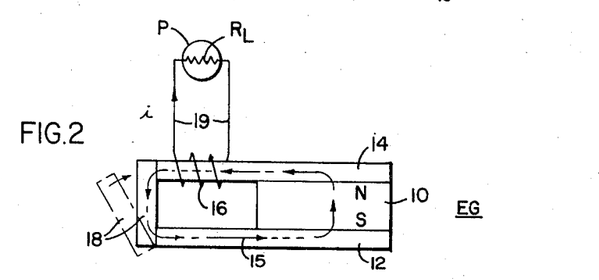
FIG. 2 is a schematic representation of the magnetic and electric circuits defined by the various components of the generator shown in FIG. 1.

As shown schematically in FIG. 2, the magnetic circuit (indicated by arrows and connecting dotted lines) is defined by the magnet 10, the pole pieces 12 and 14 and includes the keeper 18 when the latter has been tripped and is in bridging relationship with the ends of the pole pieces. The electrical circuit consists of the wire coil 16, the conductors 19 and the resistance $R_L$ of the photoflash lamp P. The voltage pulse produced by the magnetic-flux generator EG is so correlated with respect to the resistance $R_L$ of the photoflash lamp filament that the current i which flows through the electrical circuit is sufficient to rapidly and reliably fire the flashlamp P.

The reluctance of the magnetic circuit can be changed in four different ways: (1) by pulling the keeper off the pole pieces, (2) by placing the keeper onto the pole pieces, (3) by sliding the keeper on or off of the pole pieces, and (4) by rotating or sliding the keeper past the pole pieces without actually touching them.

Experiments and a computer study demonstrated that pulling the keeper 18 off the pole pieces 12, 14 or placing it onto the latter would generate the most voltage and that the voltage magnitude increased as long as the keeper 18 was accelerating. The "closing" keeper design is preferred (and is illustrated) because the force exerted on the keeper 18 increases rapidly as the gap decreases and the force required to push the open keeper 18 off the latch 22 is in keeping with the small push-button force need to trip the shutter of a camera.

Figure 3:
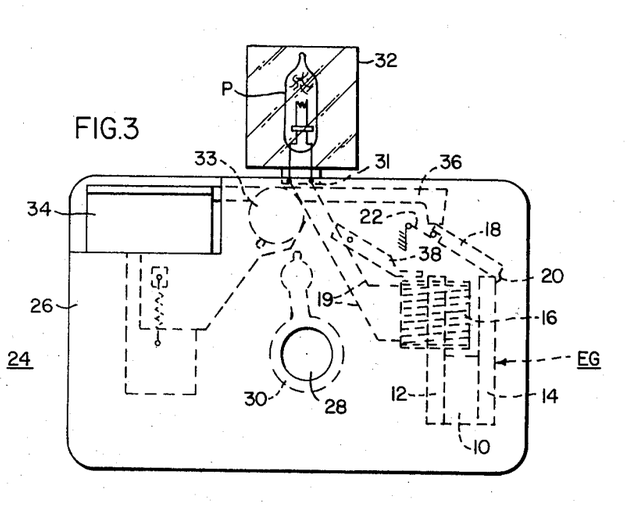
FIG. 3 is a simplified front elevational view of a camera which includes the electric generator, photoflash lamp and interconnecting circuit shown in FIGS. 1 and 2.

As shown in FIG. 3, the electric generator EG and latch 22 together with the conductors 19 comprise integral parts of a camera 24 having a housing 26, a lens 28 and a shutter 30 that opens an aperture (not shown) and exposes film when the shutter is tripped. The housing 26 encloses the generator EG and is provided with a rotatable socket 31 that releasably holds a flashcube 32 that contains four photoflash lamps P and is rotated through 90° each time the film-advancing mechanism of camera 24 is operated, thus indexing a fresh lamp P into firing position in the well-known manner.

The camera shutter 30 is actuated by a springloaded striker member 33 that is released by a push-button 34 located at the front and upper left-hand portion of the camera housing 26 (as viewed in FIG. 3). The required synchronization of the operation of the generator EG and resultant flashing of the lamp P with the opening of the aperture by the shutter 30 is achieved by a lever 36 that is attached to the push-button 34 and is so configured that its free end engages the elevated end of the keeper 18 when the latter is in its cocked position. When push-button 34 is pressed downwardly, lever 36 releases the striker member 33 (which actuates the shutter 30) and simultaneously pushes the keeper 18 away from the latch 22 so that the keeper rapidly drops into bridging position across the pole pieces 12 and 14 of the permanent magnet 10. The resulting voltage pulse generated by the wire coil 16 thus fires the photoflash lamp P in synchronism with the opening of the camera aperture.

The mass of the keeper 18 and the distance it travels (when tripped) are so small that there is no perceptible vibration or movement of the camera when the generator is actuated. The picture-taking operation is thus normal in all respects.

According to this embodiment, keeper 18 is returned to its original latched (cocked) position by another lever 38 that is coupled to and actuated by the film-advancing and shutter-cocking mechanism (not shown). Thus, the generator EG and shutter 30 are both returned to their cocked positions by the film-advancing lever (or knob) located at the back of the camera 24.

Figure 4:
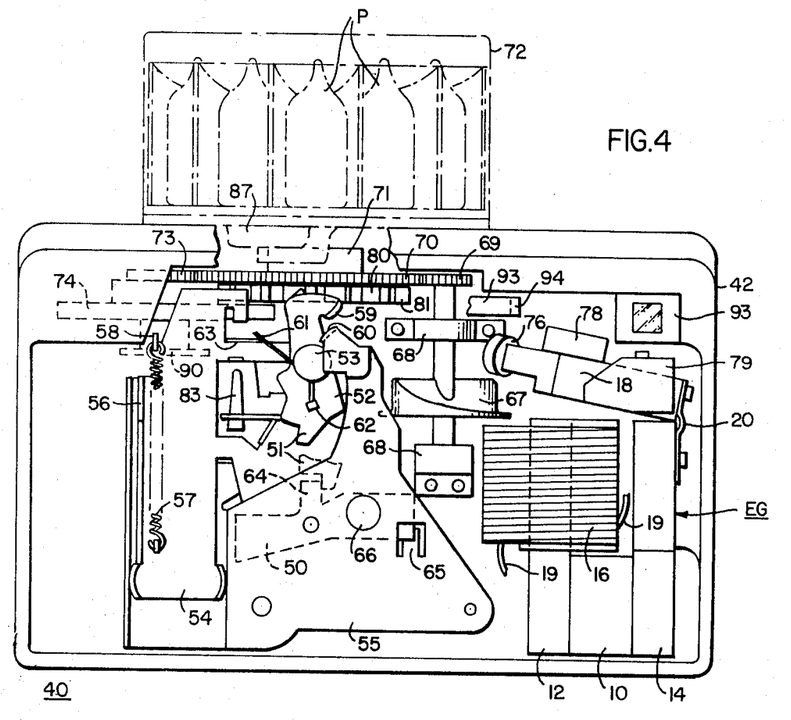
FIG. 4 is an enlarged front elevational view of the interior of a more sophisticated camera embodiment which includes an electric generator similar to that shown in the preceding figures and is provided with a multiflash unit (shown in dotted outline) which contains twelve individual photoflash lamps.
Figure 5:
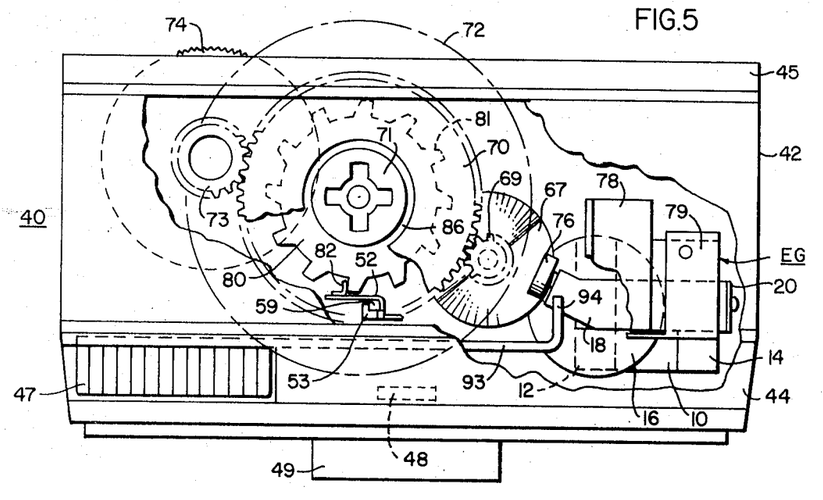
FIG. 5 is an enlarged plan view of the top of the camera shown in FIG. 4, portions of the camera housing being removed for illustrative purposes.
Figure 6:
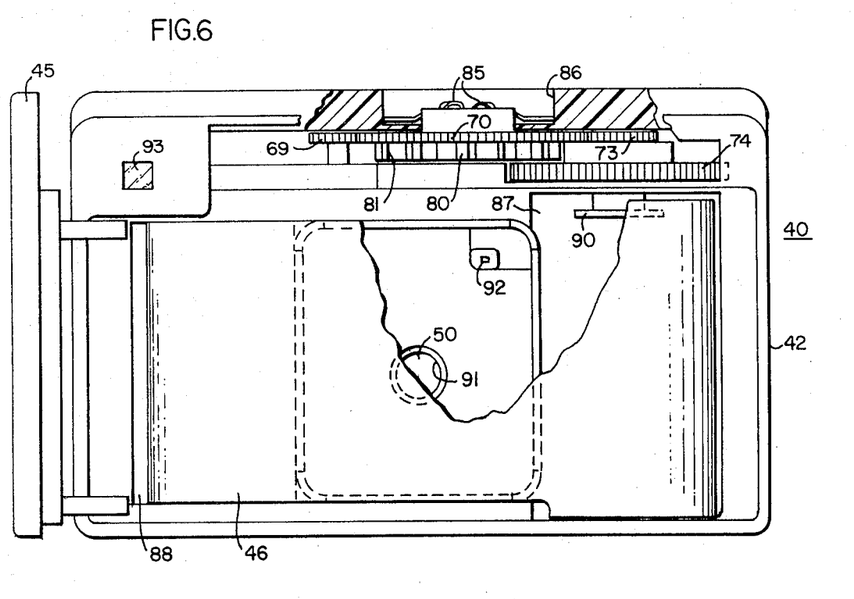
FIG. 6 is an enlarged elevational view of the opened back of the camera shown in FIGS. 4 and 5, portions of the camera housing being removed to illustrate the gear train, etc.

A more sophisticated camera design is shown in FIGS. 4–6 and will now be described. As there illustrated, this camera embodiment 40 is similar to and of the same compact size as "Instamatic" type cameras marketed by the Eastman Kodak Company. It has a housing 42 of molded plastic that includes a front panel 44 and a hinged back panel 45 that serves as a door for loading and unloading a film cartridge 46 (see FIG. 6) into the camera. The front panel 44 houses a push-button 47 and a lens 48 that is shielded by an annular shroud 49 (shown in FIG. 5).

In FIG. 4 the front panel 44 has been removed to show the structural arrangement of the various mechanisms. As illustrated, the electric generator EG (consisting of the permanent magnet 10, pole pieces 12 and 14, wire coil 16, hinged keeper 18 and spring 20) is disposed on the side of the camera housing 42 that is opposite the mechanism which cocks and triggers the shutter 50. The shutter-actuating and film-advancing mechanisms are of the standard type used in compact cameras of this kind and, as illustrated, generally consist of a pawl 51 on a striker member 52 which pivots about a pin 53 and is concurrently carried in a downward direction (as viewed in FIG. 4) along with a reciprocably movable carrier 54 to which it is attached. This carrier 54 rides within a channel defined by a plate 55 that is secured to internal portions of the camera housing 42 and holds the carrier 54 and rotatable shutter 50 in place.

Carrier 54 has a tongue 56 (FIG. 4) which is engaged by a slot recess (element 95 in FIGS. 8 and 9) on the internal surface of the push-button component 47 which is movably mounted on the front panel 44. Thus, when the push-button 47 is depressed, carrier 54 is also depressed along with striker 52 which is subsequently tripped and actuates the shutter 50 in the manner hereinafter described. After the picture is taken and push-button 47 is released, the carrier 54 and button are automatically returned to their original positions by the action of a spring 57 (FIG. 4) that is attached to the carrier and a cleat 58 on plate 55.

In FIGS. 4 and 5, the shutter-actuating mechanism and electric generator EG are shown in cocked position ready to be triggered when the push-button 47 is depressed. As the striker 52 is carried downwardly with carrier 54, a shoe 59 engages and slides around a curved guide 60 provided at the top of holding plate 55, thus swinging the striker 52 about the pivot 53 against the action of a spring 61 that encircles the pivot and is held in place by a tab 62 on the striker and a second tab 63 on the carrier 54. Upon further downward movement of the carrier 54 and striker 52, shoe 59 drops clear of guide 60 thus releasing the striker which is then rapidly rotated by the action of the tensioned spring 61. Just before striker 52 is rotated, pawl 51 on the end of the striker engages a tongue 64 on the shutter 50 (as indicated by the phantom showing of pawl 51 in FIG. 4), thus causing the shutter 50 to be flipped in a counterclockwise direction against the action of a coupled spring (not shown) and then be immediately returned to its position of rest against a protruding tab 65 on the holding plate 55. Thus, a circular hole 66 in plate 55 (which hole constitutes the aperture of the camera 40) is opened for a precisely controlled period of time sufficient to properly expose the film located in the chamber at the back of the camera.

In accordance with the present invention, the keeper 18 of the electric generator EG is cocked at the same time that the shutter-actuating mechanism is cocked and the film is advanced. This is achieved by a cam 67 (shown in FIGS. 4 and 5) that is rotatably anchored to an internal part of the camera housing 42 by suitable bushings 68 and has a gear 69 which meshes with a larger gear 70 rotatably fastened to the housing. Gear 70 carries a socket 71 which is configured to releasably hold a multi-flash lamp unit 72 (shown in dotted outline on top of the camera 40 in FIGS. 4 and 5). Gear 70, in turn, engages a third gear 73 which is integral and rotates with the film-advancing wheel 74 that protrudes slightly beyond the back of the camera 40 (as shown in FIG. 5).

Figure 7:
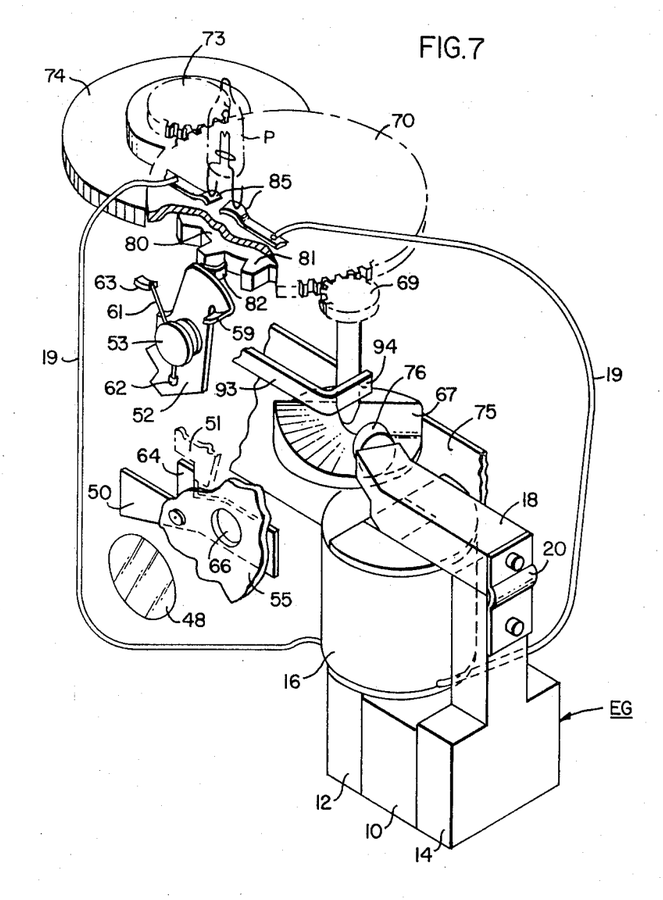
FIG. 7 is a perspective view of the electric generator, the shutter mechanism and the film-advancing and socket-rotating mechanisms employed in the camera shown in FIGS. 4–6.

As is best seen in FIG. 7, after the picture has been taken and film 75 has been exposed, the keeper 18 is disposed in bridging contact with pole pieces 12 and 14. Rotation of film-advancing wheel 74 prior to taking of the next picture rotates gears 73, 70 and 69 and causes a cam-follower 76 (which is rotatably fastened to the end of the keeper 18 and engages the surface of cam 67) to be forced upwardly, along with the keeper 18, until the latter engages and is held in raised or cocked position by an auxiliary magnet 78 (see FIGS. 4, 5) that is secured to the camera housing 42 and thus serves as the latch means for the electric generator EG.

As will be noted in FIGS. 4 and 5, keeper 18 is held in proper alignment with the pole pieces 12 and 14 of the generator EG by a cap-like cowl 79 that is attached to the camera housing 42.

An important feature of the invention is the correlation of the gear ratios in the gear train coupling the rotatable socket 71 with the film-advancing wheel 74 which permits a multiflash unit 72 (shown in phantom in FIG. 4) that contains 12 photoflash lamps P to be used with the camera 40 and such unit to be automatically rotated in a manner such that the lamps are sequentially indexed into firing position when wheel 74 is rotated to advance the film and simultaneously cock the shutter-actuating and generator-latch mechanisms of the camera 40. This is achieved by making the ratio of gears 70 and 73 such that the socket 71 is rotated through an angle of 30° each time the wheel 74 is rotated through one cycle required to advance the next position of the film into position for exposure. The ratio of gear 69 is such that cam 67 rotates 90° during this interval so that the cam-follower 76 on keeper 18 rides up the inclined portion of the cam 67 and raises the keeper into its latched and cocked position against magnet 78 (shown in FIG. 4). The surface of cam 67 is divided into two identically shaped segments for this purpose.

Cocking of the shutter-actuating mechanism during the aforesaid cycle or interval is effected by a cog 80 that is integral with and disposed beneath gear 70 (as shown in FIGS. 4–7) and has 12 teeth 81. The latter are so spaced that one of them engages a tab 82 on the end of the striker 52 (see FIG. 5) and rotates the latter into its cocked position as the wheel 74 is being rotated through one cycle. Striker 52 is locked in cocked position by a spring-loaded stop mechanism 83 which is triggered (as the striker swings into cocked position) and pushes a stop (not shown) against the teeth of wheel 74.

As shown in FIGS. 6 and 7, coil 16 of the generator EG is electrically connected by wires 19 to a pair of stationary contacts 85 disposed within the socket recess 86 provided in the top wall of the camera housing 42. The multiflash unit 72 (see FIG. 4) has a base portion 87 which is suitably shaped and holds the lead wires of the individual photoflash lamps P in such a position that they engage the contacts 85 of the camera 40 as the inserted multiflash unit is sequentially indexed in 30° steps by the gear 70 and socket 71. A compact multiflash unit which contains twelve miniaturized photoflash lamps and has these features is disclosed and claimed in the aforementioned concurrently filed application Ser. No. 380,181.

As will be noted in FIG. 6, camera housing 42 defines two generally cylindrical chambers 87 and 88 which accommodate a film cartridge 46 and permit a sprocket 90 on resetting wheel 74 to automatically engage the take-up reel (not shown) of the film cartridge in the usual fashion when the cartridge is inserted into the camera 40. Rotation of wheel 74 rolls the film 75 past an opening 91 in the housing 42 that is aligned with the camera aperture 66 in the holding plate 55. The film is locked in position by a pin 92 that engages an opening in the edge of the film in the usual manner when the stop-mechanism 83 is triggered.

Composition of the picture to be taken is accomplished by looking through a conventional viewer 93 located at the upper left-hand corner of the camera 40, as seen from the rear as shown in FIG. 6. After the film cartridge 46 is loaded into the camera 40, the rear panel 45 is closed and locked in place to provide a light-tight film chamber.

As shown in FIGS. 4 and 7, the electric generator EG is so positioned within the camera 40 that none of the generator components or the keeper-cocking and releasing mechanisms interfere with the proper exposure of the film 75 by the light passing through the lens 48 and aperture 66 in holding plate 55.

As depicted in FIG. 7, the magnetic-flux generator EG has just been actuated and keeper 18 is disposed in bridging contact with pole pieces 12 and 14 of the magnet 10 and cam-follower 76 is resting on the flat part of the surface of cam 67. The aperture 66 is closed by the shutter 50 and the tab 82 of striker 52 is positioned to be engaged by the next tooth 81 of cog 80 when the gears 69, 70 and 73 are actuated by rotation of the film-advancing wheel 74. At this point in time, the photoflash lamp P of the multiflash unit 72 that was previously indexed into electrical engagement with the socket contacts 85 has just been fired by the voltage pulse delivered from the wire coil 16 by the conductors 19.

The phantom showing of pawl 51 in FIG. 7 illustrates the manner in which it engages tongue 64 of the shutter 50 when the striker 52 is depressed by the downward pressure on the push-button 47.

Another important feature of the invention is the manner in which the electric generator EG and the shutter 50 are actuated in a predetermined time-sequence so that the photoflash lamp P is fired in synchronism with the opening of the camera aperture 66 and properly exposes the film 75. This is accomplished by the mechanism shown in FIGS. 4, 5, 7 and more particularly in FIGS. 8 and 9. As shown, such mechanism consists of a lever 93 that is attached to and moves along with the push-button 47. As will be noted in FIG. 5, the lever 93 is movable relative to the front panel 44 of the camera housing 42 and is of such length and configuration that an offset arm 94 at its free end is positioned above the keeper 18 when the latter is in its elevated and cocked position. A slot recess 95 on the inner surface of a depending part of the push-button component 47 engages the tongue 56 (FIG. 4) on the carrier 54. Thus, button 47 actuates both the shutter-tripping and generator-tripping mechanisms in a prescribed manner and time-sequence.

Figure 10:
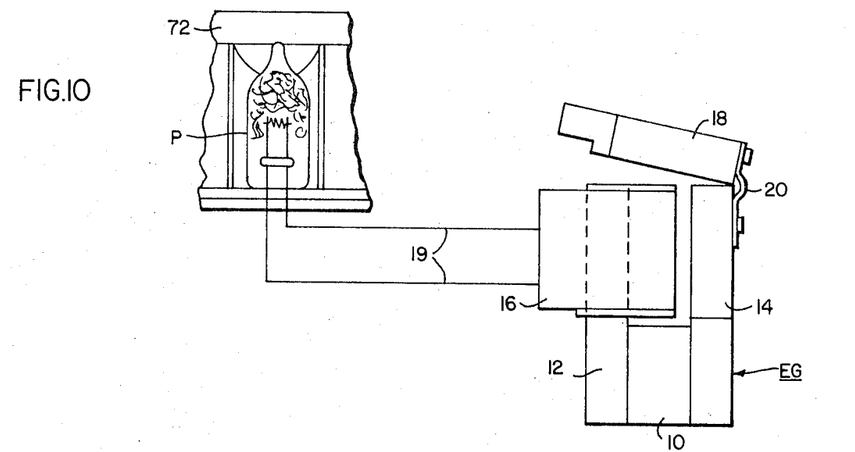
FIG. 10 is an elevational view of the electric generator employed in the camera shown in FIGS. 4–6 after the keeper has been tripped and one of the photoflash lamps in the 12-lamp flash unit is about to be fired.

In the case of a twelve-lamp flash unit 72 of type shown in FIGS. 4 and 5, the electric generator EG flashes a selected lamp P in the unit. This is illustrated in FIG. 10. As there is shown, the generator EG has just been tripped and keeper 18 is being swung down onto the pole pieces 12 and 14. Coil 16 is in the process of generating a voltage pulse which will be delivered by conductors 19 to a preselected lamp P in the flash unit 72 and ignite it.

Figure 8:
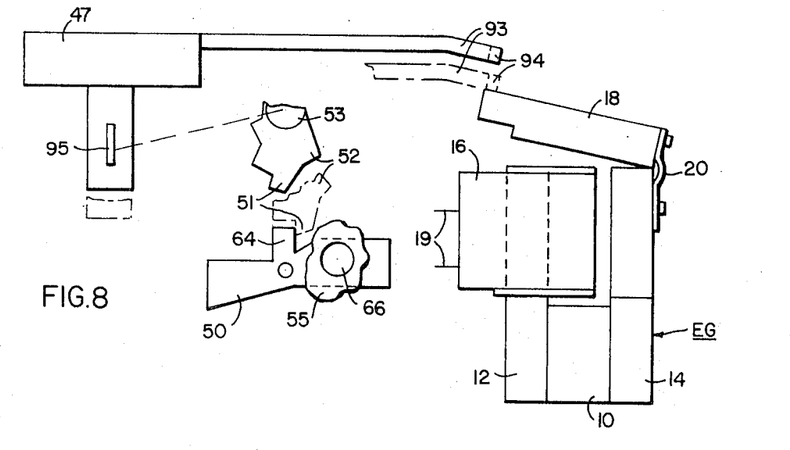
FIGS. 8 and 9 are elevational views of the electric generator, the shutter-tripping mechanism and the push-button linkage system during and after tripping of the generator, respectively.
Figure 9:
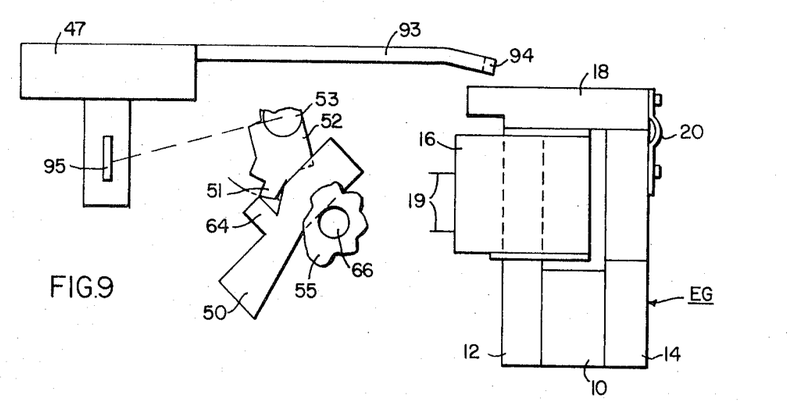

As shown in FIG. 8, when button 47 is depressed during the taking of a picture, lever 93 is also depressed and its offset arm 94 engages the end of the keeper 18. At this point in time, the pawl 51 of the striker 52 has just engaged the tongue 64 of the shutter 50 (as indicated by the phantom outline of the pawl). Further movement of button 47 causes the lever 93 to push the keeper 18 away from the magnetic latch and concurrently causes the striker 52 to flip the shutter 50 into its aperture-open position. The latch can also be a suitable mechanical latch. As shown in FIG. 9, when the aperture 66 is completely open, the keeper 18 has already been propelled into bridging contact with the pole pieces 12 and 14 and the voltage pulse has already been generated by coil 16 and ignited photoflash lamp P.

Figure 11:
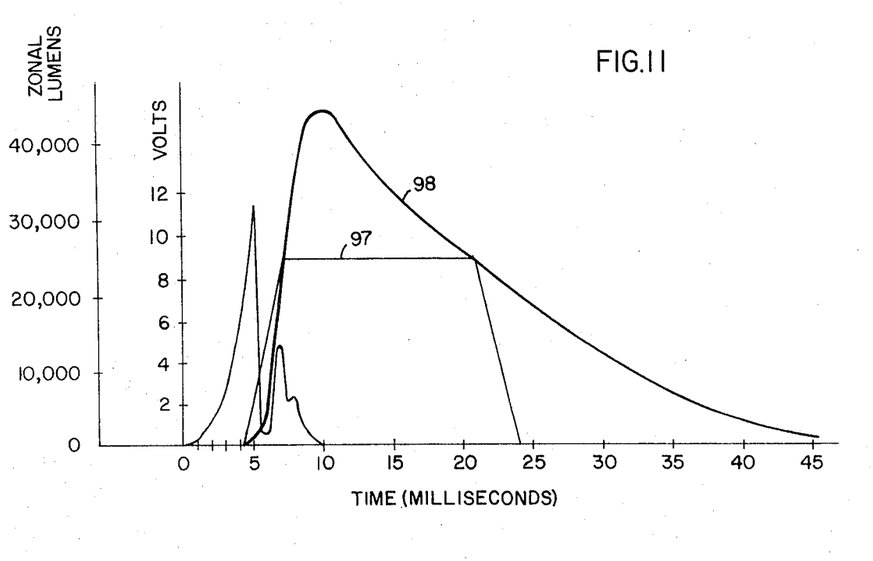
FIG. 11 is a composite graph illustrating the manner in which the voltage pulse produced by the electric generator, the light output from the fired photoflash lamp and the opening of the camera aperture by the shutter mechanism of the camera shown in FIGS. 4–6 are synchronized in accordance with the invention.

The synchronization of the voltage pulse, the flash of light produced by the ignited photolamp P and the opening of the aperture 66 achieved by the above-described structure is depicted graphically in FIG. 11. As there shown, the generation of the voltage pulse (curve 96) is so correlated that the voltage reaches a peak of over 10 volts at approximately five milliseconds after the electric generator EG is tripped and just about at the time that the camera aperture 66 begins to open (curve 97). The camera from which the data shown in FIG. 11 was obtained had a fixed shutter speed such that the aperture began to open at approximately 4 milliseconds after the electrical generator EG was actuated (at 0 milliseconds) and was completely closed 20 milliseconds later, as indicated by curve 97. The photoflash lamp P was ignited at about the same time that the voltage pulse (curve 96) reached its peak value and the light flux (curve 98) produced by the lamp reached its maximum value at about 10 milliseconds after the electrical generator was tripped and then gradually decreased to about 55 percent of its light output around 22 milliseconds (again, after the generator was tripped). Thus, the major portion of the light generated by the flashed lamp P was available and illuminated the scene being photographed while the camera aperture was open. Light output curve 98 is a typical zonal lumen-millisecond curve of a zirconium-fueled AG ½ photoflash lamp of the kind used in the well-known flashcube.

Tests have shown that by properly selecting the size and amount of wire used in coil 16, the coil impedance can be closely matched with the impedance of the flashlamps employed in the various types of multiflashlamp units presently being marketed. The electric generator will, accordingly, reliably and quickly ignite all flashlamps now in use.

Other tests have also shown that by properly correlating the size of the permanent magnet with the number of turns and size of wire used in the coil, voltage pulses having peak values of 800 volts and even 1,250 volts can be generated which will reliably fire a "spark ignition" type photoflash lamp having a primer-filled gap between the inner ends of the lead wires instead of the usual tungsten or tungsten-alloy filament that is connected to the leads and serves as an incandescible element which ignites the lamp.

We claim:

1. In combination with a photographic camera having a shutter that is controlled by a shutter-actuating mechanism, means for energizing and operating an electrical device associated with said camera comprising;

an electric generator comprising a stationary permanent magnet having a pair of spaced pole pieces that extend from said permanent magnet and together therewith define a single magnetic circuit, means movable to and from bridging relationship with said pole pieces and operative when so moved to change the reluctance of said magnetic circuit, a wire coil in inductive relationship with said magnetic circuit and oriented to generate a voltage pulse in response to changes in the reluctance of the magnetic circuit produced by the movement of said bridging means, a spring coupled to said bridging means and arranged, when tensioned and then controllably released, to rapidly shift the position of said bridging means relative to the pole pieces and cause said wire coil to generate a voltage pulse, latch means operative to hold said bridging means in spring-loaded position and, in response to the operation of said shutter-actuating mechanism, subsequently release it, and electric circuit means connected to said wire coil for delivering the generated voltage pulse to an electrical device that is associated with the camera.

2. The combination of claim 1 wherein said bridging means comprises a member of ferromagnetic material that is hingedly fastened to one of said pole pieces and is thus magnetically attracted into bridging relationship with said pole pieces when released by said latch means.

3. The combination of claim 1 wherein said bridging means is released from said latch means by means that is coupled to and controlled by the shutter-actuating mechanism.

4. The combination of claim 1 wherein;

said shutter, when actuated, opens and closes the camera aperture in a prescribed time-sequence, the electrical device associated with the camera comprises a photoflash lamp, said camera includes socket means for mounting a photoflash lamp on the camera and connecting said lamp to said electric circuit means, and said latch means is mechanically coupled to the shutter-actuating mechanism of the camera by means which correlates the operation of the electric generator with the movement of the shutter in a manner such that the generated voltage pulse ignites a photoflash lamp in said socket means at a predetermined time relative to the opening of the camera aperture by the shutter.

5. The combination of claim 4 wherein;

said bridging means is so disposed relative to the pole pieces that it is magnetically attracted by and engages said pole pieces when released by said latch means, and said spring, latch means, electric generator and electric circuit means comprise integral parts of the camera.

6. The combination of claim 5 wherein;

said socket means is structured to engage the base portion of a multiflash unit and releasably hold the multiflash unit in operative position on the camera, said camera includes means for sequentially advancing a roll of film loaded into the camera, and said socket means is rotatable and coupled to said film-advancing means by means which indexes a different lamp of said multiflash unit into firing position on the camera when said film-advancing means is operated through one cycle.

7. The combination of claim 6 wherein said socket means is coupled to the film-advancing means by gear means which indexes the socket means through an angle of 30° each time the film-advancing means is operated through one cycle.

8. The combination of claim 5 wherein;

said wire coil is located on and encircles one of said pole pieces, said bridging member comprises a ferromagnetic keeper that is hingedly secured to one of said pole pieces and is swingable to and from abutting contact with the other pole piece, and said keeper is in raised position when latched and spring-loaded.

9. The combination of claim 8 wherein;

said spring is attached to and overlies the portions of the keeper and pole piece that are hinged, and said latch means comprises an auxiliary permanent magnet that is secured to the camera structure and exerts a magnetic pull on the keeper that exceeds the counter-force applied by the spring on the keeper when the latter is in raised and latched position.

10. The combination of claim 9 wherein;

said camera includes means for advancing a roll of film loaded into the camera and concurrently cocking the shutter-actuating mechanism, a rotatable cam is disposed proximate the free end of said keeper, said cam is coupled to and rotated by the film-advancing means when the latter is operated, the keeper has a cam-follower on its free end that engages said cam when the keeper is in tripped position, and said cam is so configured that the keeper is swung away from said one pole piece toward and into latched engagement with said auxiliary magnet when the cam is rotated by the film-advancing and shutter-cocking means.

11. The combination of claim 10 wherein;

said rotatable cam has a flat portion and a merging inclined portion, and the cam-follower of said keeper is on the flat portion of the cam when the electric generator is in tripped position.

12. The combination of claim 11 wherein;

the surface of said cam is divided into two identically shaped segments each having a flat portion and an inclined portion, and the coupling between said cam and film-advancing and shutter-cocking means is such that the cam rotates 90° when the film-advancing and shutter-cocking means is operated through one cycle.

13. The combination of claim 10 wherein;

said shutter-actuating mechanism is released from its cocked position by means that is coupled to a push-button located on an exterior part of the camera, and said push-button, when depressed, actuates a tripping means that engages the keeper and then exerts a force thereon which is sufficient to release the keeper from latched relationship with said auxiliary magnet.

14. The combination of claim 4 wherein the electrical impedance of the wire coil component of said electric generator is substantially the same as that of the photoflash lamp that is associated with the camera.

15. The combination of claim 4 wherein;

the photoflash lamp that is associated with the camera has a primer-filled gap and is thus a spark-ignition type flashlamp, and the size of the permanent magnet is so correlated with respect to the size of the wire and the number of turns in the wire coil that the generated voltage pulse produced by the electric generator is sufficient to fire said flashlamp.

* * * * *

UNITED STATES PATENT OFFICE
CERTIFICATE OF CORRECTION

Patent No. 3,842,427           Dated October 15, 1974

Inventor(s) William E. Shoupp et al.

It is certified that error appears in the above-identified patent and that said Letters Patent are hereby corrected as shown below:

On the Cover Sheet, the following should be added:

--[73] Assignee: Westinghouse Electric Corporation, Pittsburgh, Pa. --.

Signed and Sealed this twenty-second Day of June 1976

[SEAL]

Attest:

RUTH C. MASON
Attesting Officer

C. MARSHALL DANN
Commissioner of Patents and Trademarks